United States Patent
Keller et al.

(10) Patent No.: US 9,498,861 B2
(45) Date of Patent: Nov. 22, 2016

(54) METHOD AND DEVICE FOR MACHINING ELONGATE WORKPIECES THAT ARE NOT ROTATIONALLY SYMMETRICAL IN THE FORM OF TURBINE BLADES

(75) Inventors: Horst Keller, Staad (CH); Roland Geiger, Rorschacherberg (CH)

(73) Assignee: Starrag Ag, Rorschacherberg (DE)

( * ) Notice: Subject to any disclaimer, the term of this patent is extended or adjusted under 35 U.S.C. 154(b) by 623 days.

(21) Appl. No.: 13/824,838

(22) PCT Filed: Sep. 20, 2011

(86) PCT No.: PCT/EP2011/004704
§ 371 (c)(1),
(2), (4) Date: Jun. 10, 2013

(87) PCT Pub. No.: WO2012/038064
PCT Pub. Date: Mar. 29, 2012

(65) Prior Publication Data
US 2013/0269189 A1  Oct. 17, 2013

(30) Foreign Application Priority Data

Sep. 24, 2010  (DE) .................... 20 2010 008 628 U

(51) Int. Cl.
*B23Q 1/76* (2006.01)
*B23Q 1/64* (2006.01)
(Continued)

(52) U.S. Cl.
CPC ................ *B23Q 1/64* (2013.01); *B23B 3/065* (2013.01); *B23C 3/18* (2013.01); *B23Q 1/527* (2013.01);
(Continued)

(58) Field of Classification Search
CPC ........... B23Q 1/76; B23Q 1/527; B23Q 3/062; B23Q 1/763; B23Q 1/766; B23Q
(Continued)

(56) References Cited

U.S. PATENT DOCUMENTS

| 4,177,701 A | 12/1979 | Schulz |
| 4,215,604 A * | 8/1980 | Blaimschein ............. B23C 3/08 82/106 |

(Continued)

FOREIGN PATENT DOCUMENTS

| CH | 686 878 A5 | 7/1996 |
| DE | 360222 | 9/1922 |

(Continued)

OTHER PUBLICATIONS

International Search Report dated Mar. 1, 2012 with English translation (Four (4) pages).

*Primary Examiner* — David Bryant
*Assistant Examiner* — Steven A Maynard
(74) *Attorney, Agent, or Firm* — Crowell & Moring LLP

(57) ABSTRACT

In a method and a device for machining an elongate workpiece that is not rotationally symmetrical in the form of turbine blades, the workpiece is supported by a steady rest that has clamping elements for clamping the workpiece on the cross-section thereof that is not rotationally symmetrical. After clamping the workpiece, the steady rest moves with its open clamping elements along the longitudinal axis of the workpiece into a supporting position. During movement of the steady rest into the supporting position and/or while the supporting position of the steady rest is being changed, a collision between the open clamping elements of the steady rest and the workpiece is prevented by a program-controlled rotation of a rotary part of the steady rest.

7 Claims, 2 Drawing Sheets

(51) Int. Cl.
   *B23B 3/06* (2006.01)
   *B23C 3/18* (2006.01)
   *B23Q 1/52* (2006.01)
   *B23Q 3/06* (2006.01)

(52) U.S. Cl.
   CPC .............. *B23Q 1/76* (2013.01); *B23Q 1/763*
   (2013.01); *B23Q 3/062* (2013.01); *B23C*
   *2215/44* (2013.01); *Y10T 29/49336* (2015.01);
   *Y10T 29/5114* (2015.01); *Y10T 82/10*
   (2015.01)

(58) Field of Classification Search
   CPC .............. 3/063;B23Q 3/064; B23Q 2703/10;
   B23Q 1/52; B23C 3/18; B23C
   2215/44; B23C 3/16; B23C 2270/08;
   Y10T 29/49336; Y10T 29/5114; Y10T
   82/10; Y10T 29/5109; Y10T 82/2593;
   Y10T 82/2597; B23P 15/02; B23B
   13/126; B23B 13/128; B23B 13/021;
   B23B 2215/81; B25B 1/2478; B25B
   1/2489; B25B 1/20
   USPC .................................................. 82/162, 164
   See application file for complete search history.

(56) References Cited

U.S. PATENT DOCUMENTS

| | | | | |
|---|---|---|---|---|
| 5,275,072 | A * | 1/1994 | Schmid | B23B 31/16004 82/106 |
| 5,282,403 | A * | 2/1994 | Rouleau | B23B 31/1269 82/127 |
| 8,555,756 | B2 * | 10/2013 | Arana Beobide | B23B 5/18 451/49 |
| 2008/0213057 | A1 | 9/2008 | Betschon et al. | |
| 2009/0001643 | A1 | 1/2009 | Rehm | |

FOREIGN PATENT DOCUMENTS

| | | |
|---|---|---|
| DE | 28 46 851 A1 | 4/1979 |
| DE | 195 39 488 A1 | 10/1996 |
| DE | 100 26 829 A1 | 12/2001 |
| DE | 10 2004 056 142 A1 | 6/2006 |
| DE | 10 2005 001 555 A1 | 7/2006 |
| DE | 10 2007 029 492 B3 | 1/2009 |
| DE | 10 2009009 056 A1 | 8/2010 |
| WO | WO 2006/122440 A1 | 11/2006 |

* cited by examiner

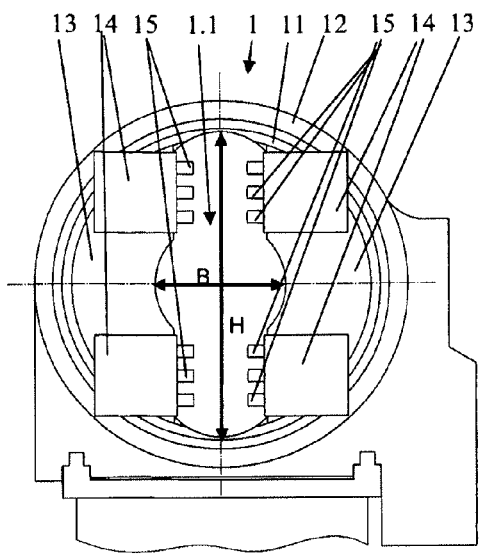
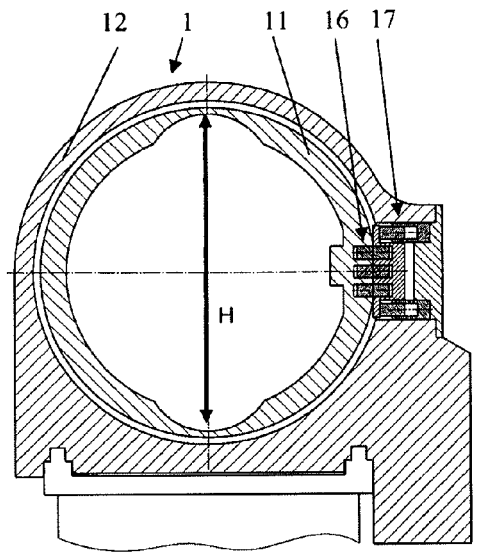
Fig. 3
Fig. 4
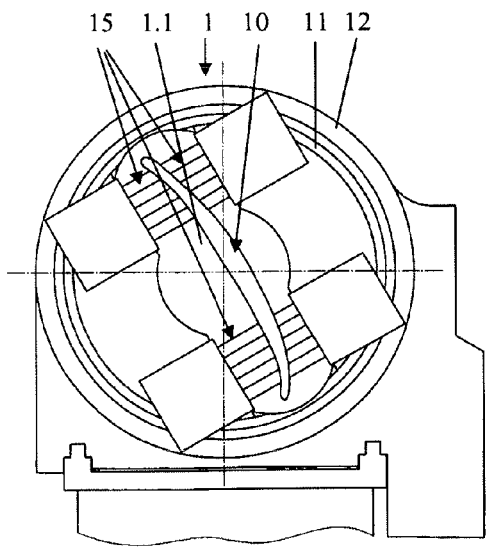
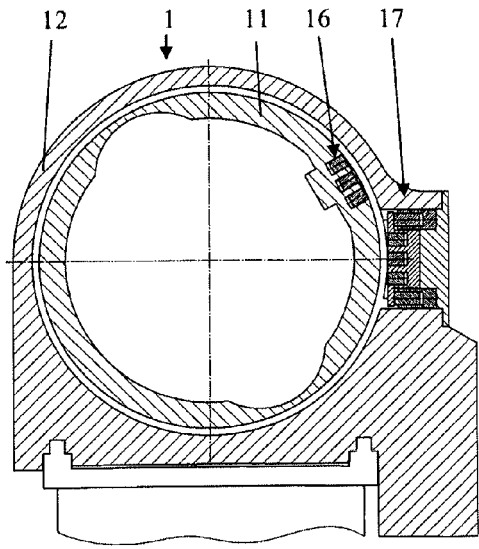
Fig. 5
Fig. 6

METHOD AND DEVICE FOR MACHINING ELONGATE WORKPIECES THAT ARE NOT ROTATIONALLY SYMMETRICAL IN THE FORM OF TURBINE BLADES

CROSS REFERENCE TO RELATED APPLICATIONS

This application is a national phase of PCT International Application No. PCT/EP2011/004704, filed Sep. 20, 2011, which claims priority under 35 U.S.C. §119 from German Patent Application No. 20 2010 008 628.0, filed Sep. 20, 2010.

BACKGROUND AND SUMMARY OF THE INVENTION

The present invention relates to a method and a device for machining elongate, non-rotationally symmetrical workpieces in the form of turbine blades using a steady rest that supports the workpiece in accordance with the preambles of the first and eighth patent claims.

When elongate workpieces are mechanically machined, they are often clamped on the two end faces. Since such a clamping procedure allows the workpiece to rotate about the longitudinal axis by means of suitable axes of rotation, the workpiece can be machined on all of the longitudinal sides without having to rechuck. For specific workpiece geometries, for example, the milling of turbine blades, such a chucking operation is necessary, because the workpiece has to be machined continuously over the entire periphery of the longitudinal sides. In the case of other workpieces the workpiece can be finish-machined in only one chucking operation (in contrast to the clamping on a longitudinal side). As a result, time is saved and accuracy is gained, because errors arising between multiple chucking operations are avoided.

With such long and relatively fragile components, such as turbine blades, there is often the problem that such workpieces exhibit a very low rigidity that is much less than the rigidity of the machine that is used. On the one hand such components yield, due to the force of gravity and the machining forces, a feature that results in geometric deviations of the workpieces; and, on the other hand, a high rigidity is necessary for a stable cut in the mechanical machining operation. It is known to support the rotationally symmetrical workpieces with a steady rest for the turning operation. This arrangement dramatically reduces the flexibility of the workpieces.

For example, U.S. Pat. No. 4,177,701 A and DE 10 2007 029 492 B3 describe such steady rests for the turning operation of rotationally symmetrical workpieces. These steady rests have two jaws that can be pivoted in relation to each other and that are configured for receiving the rotationally symmetrical workpiece. The steady rests have roller bearings on their inside diameters; and the work pieces are mounted and supported in a rotational manner by these roller bearings. These steady rests do not lend themselves to machining elongate workpieces with three dimensional free form surfaces, as is the case, for example, with turbine blades.

DE 360222A describes a machine tool for machining elongate turbine blades. In this case the workpiece is clamped on one end; and the central part of the workpiece is held by a rotary part of a steady rest. The steady rest and the rotating spindles are arranged in such a way that they can be rotated vertically. At the same time the steady rest cannot be directed in the direction of the workpiece and is secured on the vertical axis. The steady rest can be moved vertically by means of a screw spindle. An automatic control unit makes it possible to lock and unlock the workpiece in the steady rest. The rotary part of the steady rest is provided with sliding fingers in order to hold the workpiece; and these sliding fingers can be moved in a resilient manner against the workpiece and can be blocked by means of a device. In this case five follow rests are provided for the simultaneous machining of 5 workpieces; and these five follow rests can be moved vertically between a bottom fixed support bracket and an upper support bracket on a counter column by means of a slide for the purpose of clamping the workpiece on the end side. The five turbine blades are inserted transversely through the steady rests, which were unlocked beforehand and moved to the one end of their runway; and these five turbine blades are clamped between the two support brackets. The milling heads that are inserted into the rotating spindles begin the machining at the upper end of the blades; and at the same time the slide with the steady rest is also brought to the suitable height, so that the steady rests can hold the workpieces in the immediate vicinity of the working range of the tool; and the workpieces are clamped into the steady rests by means of four fingers. The machining begins, while the milling heads, mounted on the rotating spindles, engage with the workpieces at their upper end and experience a descending feed motion. The rotary parts of the steady rests are entrained in rotation by means of the blades. Hence, there is no separate rotary drive of the steady rests. For a defined period of time the steady rests stay on the same plane; and the slide, which carries them, is blocked on this plane. In order to prevent the milling heads from moving too far from the region of the steady rests, after they have descended, the steady rests descend by a predefined step. To this end, the machining operation and the rotating motion of the blades stop; the steady rests are unlocked; the slide carrying the steady rests is released; the slide descends by one step; there is an additional blocking; the steady rests are clamped anew on the workpieces; and the machining operation and the rotating motion of the blades resume. The result of this arrangement is that a continuous and, hence, effective machining of the workpieces in not possible. Furthermore, the entire setup for supporting the workpiece(s) is distinguished by a complicated design configuration.

A clamping device for the peripheral-sided clamping of workpieces having an arbitrary circumferential contour is proposed in DE 195 39 488 A1. In this case there are two mutually opposite profiled clamping jaws, which are disposed on a base body and exhibit clamping surfaces. Each of these clamping surfaces is formed by a plurality of rams, which can be fluidly moved independently of each other against the workpiece to be clamped and can be locked in the clamping position. The base body is mounted in a holding device by means of bearing rollers in such a way that the base body can be rotated about a vertical axis that is directed towards the clamping device. The base body is driven via a gear rim, which is disposed on the periphery of the base body, and via corresponding drive wheels by means of a drive motor. Both the base body and the holding device have outwards extending recesses in order to insert the workpiece, thus increasing the risk that high forces will cause the workpiece to spring back. The workpiece is clamped by means of two slides that are arranged opposite each other and can be moved in relation to each other. These slides are provided with profiled clamping jaws in the direction of the workpiece. Each profiled clamping jaw has a plurality of hydraulically adjustable rams, which can be adjusted with respect to the workpiece in order to clamp the workpiece. In order to make, for example, a turbine blade, the first step is to finish-machine a holding end in a machining center on a corresponding blank. Then the blank is chucked at this holding end; and the curved blade surfaces are produced in one or more machining operations in the customary way. Since the opposite holding end that still has to be machined is located relatively far away from the chucked holding end, its machining would present a problem without additional measures. Therefore, the holding device is then moved in the longitudinal direction until it is positioned next to the machined blade surfaces to be machined. To this end there are longitudinal guides. At this point the holding device is moved transversely to the longitudinal direction of the partially machined turbine blade on the transverse guides, as a result of which this partially machined turbine blade moves through the recess as far as up to the chucking opening. This transverse movement necessitates a larger amount of working space. At this point the holding device is positioned in such a way that the longitudinal axis of the partially machined turbine blade coincides with the axis of rotation of the base body. At this point the turbine blade is clamped in the base body with the aid of the profiled clamping jaws. Now the still uncut holding end of the turbine blade can be machined. To this end the partially machined turbine blade can be rotated in the required way by means of the drive motor. In this case this rotation can also be accomplished by means of the chucked, already machined holding end of the turbine blade. After the machining operation, the profiled clamping jaws are released, and the holding device is moved laterally away from the turbine blade. At this point the next turbine blade can be chucked; and the described procedure can be repeated. Since the machining operation has to be interrupted in order to support by means of the steady rests, this feature also constitutes a drawback for the profitability of the machining operation.

Moreover, numerous solutions for clamping workpieces in the form of turbine blades are known from the prior art (DE 10 2004 056 142 A1, DE 10 2005 001 555 A1, DE 100 26 829 C2). These prior art solutions comprise a plurality of clamping elements, which can be clamped against the workpiece surface, but do not allow them a rotational motion of the workpiece.

The publication DE 28 46 851 A1 also discloses a machine tool for machining turbine blades, wherein the workpiece is supported by a rotary part of a steady rest. The aim of this solution is to automate the displacement processes, the unlocking and the locking of the steady rest on its support and on the workpiece. In this case the steady rest is always supposed to be in the working range of the tool, in order to rule out as far as possible the generation of vibrations. In this case the workpiece can rotate in a fixed part of the steady rest. At the same time the machine has devices for automatically controlling the locking and unlocking of the workpiece in the rotary part of the steady rest. And the displacement of the steady rest is controlled. Thus, the steady rest is not actively driven in a rotatable manner, but rather the rotary parts of the steady rests are entrained in rotation by the blades. As a result, torsions in the workpiece may occur; and these torsions in turn may lead to undesired variations in the tolerances.

Furthermore, the steady rest does not move over the clamping point in order to insert the workpiece.

DE 100 26 829 A1 describes a device for securely clamping a workpiece having uneven surfaces. In this case a clamping element or an element, which is coupled in a drive relationship with the clamping element, is provided with a thread, thereby assigning to the linear feed movement of the clamping element a rotating motion of the respective threaded element in relation to the clamp block; with a rotation actuator, which is coupled to the rotatable threaded element for its rotary drive; and with engagable and disengageable means, which can be assigned to at least one clamping element in order to stop the rotatable threaded element by jamming and/or friction, said means comprising a preferably elastic friction element, in particular a jamming element, which allows a torque-free stopping of the rotatable threaded element. In this case, too, there is no rotary drive of the clamping element.

A steady rest for machining rotary parts or crankshafts is described in the publication DE 10 2009 009 056 A1. The workpiece, which is rotationally symmetrical at the clamping point, is supported by the steady rest in order to compensate for the workpiece deflection; and this steady rest can be moved along the machining axis in order to change the workpiece over a clamping point. The steady rest is moved along the machining axis by means of a control unit. During the machining of a crankshaft, the steady rest rotates passively along. The entire process of positioning the steady rest, of clamping and centering the workpiece runs automatically and is controlled by a control unit. It is indicated, as a matter of fact, that the steady rest can be used with a suitable drive as a center drive, but only for rotationally symmetrical workpieces or more specifically crankshafts; and there is no pointer to a specific embodiment. In any event this solution does not lend itself to machining non-rotationally symmetrical workpieces in the form of turbine blades, which have a non-rotationally symmetrical cross section at the clamping point of the steady rest.

The object of the present invention is to develop a method and a device for machining elongate non-rotationally symmetrical workpieces in the form of turbine blades, wherein the workpiece is supported by means of a steady rest, and wherein a simple design configuration of the device as well as an improved machining cycle are guaranteed.

This engineering object is achieved by means of the features disclosed in the first and eighth patent claims.

Advantageous embodiments will be apparent from the dependent claims.

The method for machining elongate, non-rotationally symmetrical workpieces in the form of turbine blades is carried out with the use of a first clamping point for a first end of the workpiece and a second clamping point for a second end of the workpiece, wherein the workpiece is supported by means of a steady rest, which has clamping elements for clamping the workpiece on its non-rotationally symmetrical cross section, wherein, according to the invention, after clamping the workpiece between the first and the second clamping point, the steady rest moves with its open clamping elements along the longitudinal axis of the workpiece into a supporting position; and during the movement of the steady rest into the supporting position and/or in the course of changing the supporting position of the steady rest, a collision between the open clamping elements of the steady rest and the workpiece is prevented by means of a program-controlled rotation of a rotary part of the steady rest.

For loading and unloading the workpiece, the steady rest moves at least partially over the first or second clamping point in such a way that the region between the first and the second clamping point is accessible for inserting and clamping the workpiece. As a result, it is possible to move the steady rest only longitudinally to the workpiece and to dispense with a time-consuming and complicated transverse guide that is cost intensive and requires a larger amount of installation space. Furthermore, the solution according to the invention simplifies the process flow.

After clamping the workpiece between the first and the second clamping point, the steady rest moves along the longitudinal axis of the workpiece into a supporting position. At the same time during the movement of the steady rest, collisions with the workpiece are prevented in an advantageous way by means of a program-controlled rotation of the steady rest.

When the steady rest is in the supporting position, said steady rest clamps the workpiece by means of one or more clamping elements, whereupon the machining of the workpiece begins.

Preferably the clamping elements of the steady rest are designed in the form of hydraulic clamping elements. In order to actuate said clamping elements, the steady rest is rotated into a docking position, in which a connection to the corresponding hydraulic elements can be made and can be separated. In this docking position the clamping elements are loaded with a hydraulic pressure by means of the hydraulic elements; and, as a result, the clamping elements are actuated and transferred into a clamping position, so that the workpiece is chucked and clamped in the steady rest. At the same time a collision between the open clamping elements of the steady rest and the workpiece is prevented by means of the program-controlled rotation of the steady rest.

Then the connection to the hydraulic elements is released and the clamping is still retained; and then the machining of the workpiece begins.

In order to machine the region of the workpiece that the steady rest covers, the clamping of the clamping elements of the steady rest to the workpiece is released; and the steady rest is moved along the longitudinal axis of the workpiece and, if desired, chucked and clamped again at a different position. In this case, too, there is a program-controlled rotation of the steady rest, so that a collision of the open clamping elements or other regions of the steady rest with the workpiece is prevented.

After the clamping elements are chucked and clamped into this position and, as a result, are fixed, the rotary part of the steady rest can be rotated with the workpiece about its longitudinal axis in order to ensure machining on the periphery.

It is also possible that the steady rest is arranged between the clamping points during the rotating machining of the workpiece and chucks the workpiece and rotates synchronously to the drives of the clamping points by means of a rotary drive, so that torsional stresses in the workpiece are reduced and prevented.

The device for machining elongate, non-rotationally symmetrical workpieces in the form of turbine blades, wherein a first clamping point for clamping a first end of the workpiece and a second clamping point for clamping a second end of the workpiece are provided, and the workpiece is supported by means of a steady rest, which can be moved along a longitudinal axis of the workpiece and has clamping elements for clamping the workpiece on its non-rotationally symmetrical cross section, said clamping elements being arranged on a rotary part and can be moved between a closed clamping position, with which the workpiece can be clamped, and an open position, in which the workpiece is released, wherein, according to the invention, the rotary part has a separate rotary drive and that the device has a control unit for the program-controlled rotation of the rotary part of the steady rest when the steady rest is moved along a longitudinal axis of the workpiece, wherein the clamping elements are arranged in the open position during the movement of the steady rest.

The steady rest can be moved in an advantageous way along the longitudinal axis of the first and the second clamping points by means of a slide and the associated guides. In this case the longitudinal axes of the clamping points are coaxial to each other and to the longitudinal axis/the machining axis of the workpiece.

Owing to the fact that the workpiece can be moved over the first and/or the second clamping point, in this position the region between the first and the second clamping point is accessible for inserting and removing the workpiece, as a result of which the aforementioned and described advantages can be achieved.

To this end the steady rest has a breakthrough, which guarantees a through-passage of the workpiece as well as the first and/or the second clamping points.

In order to clamp the workpiece in the region that is located between the end-sided clamping points, the steady rest has one or more clamping elements, which can be moved between a closed clamping position, with which the workpiece can be clamped, and an open position, so that a clearance between the clamping elements guarantees the through-passage of the first and/or the second clamping points through the steady rest.

The steady rest has a rotary part, which can be rotated with the workpiece about its longitudinal axis. The rotary part is mounted in a rotatable manner in a base body and has clamping elements for clamping the workpiece.

The rotary part and the base body are designed in such an advantageous way that both the rotary part and the base body are closed on the periphery, as a result of which a high rigidity of the steady rest is achieved. This circumferentially closed design is only possible, if the steady rest does not have to be moved transversely to the workpiece, but rather moved over one of the clamping points in order to insert the workpiece.

The clamping elements of the steady rest can be connected to or can be separated from the corresponding hydraulic elements in a docking position, so that it is guaranteed that the rotatable part of the steady rest can be rotated unimpeded in the base body after the separation from the hydraulic elements.

The rotary part is provided with a separate rotary drive in an advantageous way and can be moved along the longitudinal axis of the first and the second clamping points by means of a slide and the associated guides. In this case the longitudinal axes of the clamping points are coaxial to each other and to the longitudinal axis/the machining axis of the workpiece.

The invention provides a surprisingly simple possibility for the use of a steady rest. In this case it is possible to achieve an unimpeded insertion of the workpiece and still retain the distance between the clamping points. Furthermore, the steady rest is not moved transversely to the workpiece, but rather along the longitudinal axis, so that a simple and compact insertion for machining elongate, non-rotationally symmetrical workpieces, in particular, turbine blades, is provided.

The invention is explained in detail below by means of one exemplary embodiment and with reference to the associated drawings.

BRIEF DESCRIPTION OF THE DRAWINGS

FIG. 3 is a front view of the steady rest with open clamping elements.

FIG. 4 is a sectional view, according to FIG. 3, in the docking position.

FIG. 5 is a front view of the steady rest with a turbine blade, clamped by means of the clamping elements, in a machining position.

FIG. 6 is a sectional view according to FIG. 5.

DETAILED DESCRIPTION OF THE DRAWINGS

Figure 1:
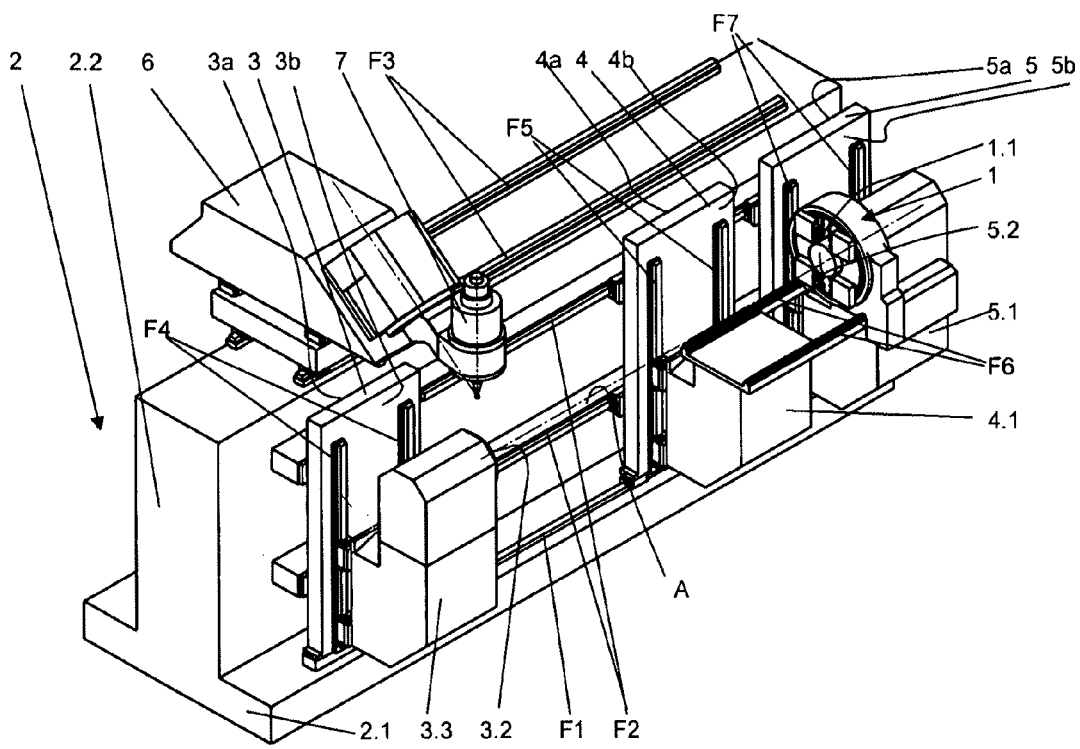
FIG. 1 is a three dimensional rendering of a device with a steady rest, which is located over a first clamping point for the insertion of a workpiece.
Figure 2:
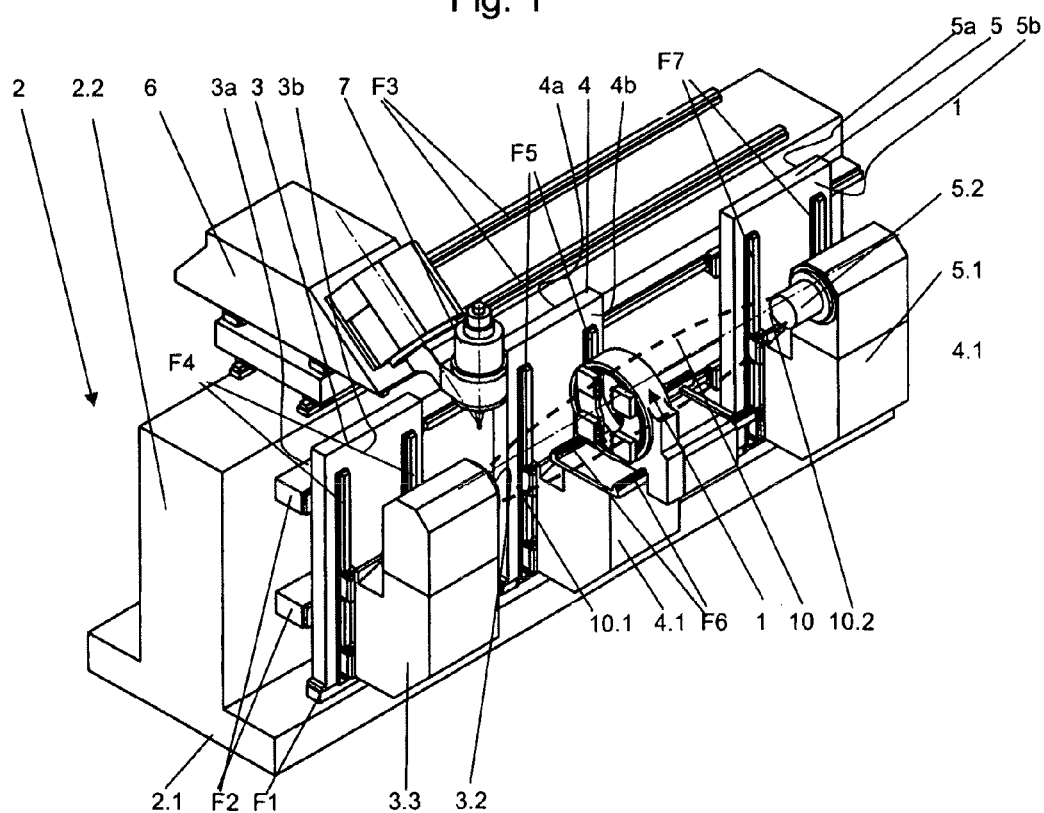
FIG. 2 is a three dimensional rendering of a device with a steady rest, which is located in a supporting position of the workpiece.

FIGS. 1 and 2 show a three dimensional rendering of a device, wherein, according to FIG. 1, a steady rest 1 is in a position for inserting a workpiece, which is not illustrated; and, according to FIG. 2, the steady rest 1 is arranged in a supporting position for machining a workpiece, which is located in the device and is indicated with the dashed lines.

The device has a bed 2 with a bottom horizontal first leg 2.1 and a second leg 2.2, which extends vertically upwards away from said first leg. The bottom leg 2.1 has on its top side a first guide F1. In the upwards extending region 2.2 of the second leg 2.2 a second guide F2 comprising two guide rails, which are parallel to each other, is arranged on the vertical side facing the first guide F1. A third guide F3 with two guide rails that are parallel to each other is provided on the top side of the second leg 2.2.

A first table 3, a second table 4 and a third table 5 with its bottom edge are supported on the first leg 2.1 and are guided by the first guide F1; and the inner side faces 3a, 4a, 5a of the tables 3, 4, 5 that face in the direction of the leg 2.2 are guided by the second guides F2.

The first table 3 has on its outer side face 3b a vertically extending third guide F5 with two parallel guide rails, through which a first slide 3.1 is received in such a way that it is vertically adjustable. A first clamping point 3.2 for clamping the workpiece, which is not shown in this example, is provided on the first slide 3.1.

The outer side face 4b of the second table 4 also has vertically extending fifth guides F5 with two parallel guide rails, through which a second slide 4.1 is received in such a way that it is vertically adjustable. The outer side face 4b of the second slide 4.1 has a sixth guide F6 comprising two guide rails, by which the steady rest 1 is guided in a horizontally moveable manner in the direction of the first and the second guides F1, F2.

The outer side face 5b of the third table 5 also has a vertically extending seventh guide F7 with two parallel guide rails, through which a third slide 5.1 is received in such a way that it is vertically adjustable. The second slide 5.1 has in the direction of the first clamping point 3.2 a second clamping point 5.2 for clamping the workpiece, which is not shown in this example. The first, the second and the third table 3, 4, 5 are in essence identical in their construction, so that the second and the third table 4, 5 can be moved relative to each other and to the first table 3 along the first and the second guide F1, F2. The axis of rotation (machining axis) A of the workpiece, which is not shown, is coaxial to the axes of the first clamping point 3.2, the second clamping point 5.2 and the steady rest 1.

According to FIG. 1, the second clamping point 5.2 passes through a breakthrough 1.1 of the steady rest 1, so that the region between the first clamping point 3.2 and the second clamping point 5.2 is free for inserting a workpiece. To this end the second table 4 with the second slide 4.1 and the steady rest 1, located thereon, was moved into its outermost (in this case the right) end position, so that the steady rest 1 reaches over the second clamping point 5.2. In this context the second clamping point 5.2 is made as thin as possible.

The upper third guide F3 of the bed 1 has a support 6, which can be moved along the machining axis A. This support carries a milling head 7, with which the machining of the workpiece is carried out.

According to FIG. 2, a workpiece 10 was clamped with a first end 10.1 in the first clamping point and with a second end 10.2 in the second clamping point 5.2; and the steady rest 1 was moved out of its end position, shown in FIG. 1, with the second table 4 (first and second guides F1, F2) and over the sixth guides F6 on the second slide 4.1 in the direction of the first clamping point 3.2, so that the steady rest 1 is now located in essence in the middle between the first and the second clamping point 3.2, 5.2 in a supporting position. In this position the workpiece 10 is clamped in a docking position by means of the clamping elements 15 (see FIG. 5) of the steady rest 1.

The steady rest 1 is actively driven about the axis of rotation A and in the longitudinal movement. Therefore, at this point a position can be reached automatically for clamping the turbine blade/the workpiece 10. During a movement in the clamped state, the active drive of the rotating movement of the steady rest 1 does not generate frictional moments that could twist the workpiece 10.

The rotation of the steady rest 1 is carried out by means of a servo motor (not illustrated), which drives a mounted shaft (also not illustrated) by means of a gear train. The modular design of the device makes this device easy and economical to manufacture.

In addition to the design variant shown in FIGS. 1 and 2, it is also possible to design the first clamping point in such a way that the steady rest can move in the axial direction over said first clamping point in order to load and unload.

FIG. 3 shows a schematic diagram of the steady rest 1 in a front view (in the docking position). The steady rest 1 has an essentially rotationally symmetrical rotary part 11 in the form of a ring. Said rotary part is closed on the peripheral side and is mounted in a base body 12, which is also closed on the peripheral side, in such a way that it can be rotated. The rotary part 11 has two clamping plates 13, which are spaced apart from one another and form a breakthrough 1.1 having a height H and a width B. These clamping plates lend themselves well to receiving the workpiece (not illustrated in this example) on the peripheral side. Furthermore, the width B is somewhat larger than the diameter of the second clamping point 5.2 (see FIGS. 1 and 2). Two clamping jaws 14 are spaced apart from one another on the clamping plates 13 and are provided in pairs that lie opposite one another in this case on the upper and lower region of the breakthrough 1.1. The hydraulically actuable clamping elements 15 of these clamping jaws can be moved towards each other. There are no clamping elements in the central region, in order to guarantee that the steady rest 1 with the breakthrough 1.1 can be moved over the second clamping point 5.2.

A sectional view, according to FIG. 3, is shown in FIG. 4, in addition to the clamping plates in the docking position. It is clear from this sectional view that a connection from the first hydraulic elements 16 for actuating the clamping elements 15 in the rotary part 11 to the corresponding second hydraulic elements 17 in the base body 12 can be made in the docking position. In this position when the workpiece is inserted, the clamping elements 15 can be actuated in the direction of the workpiece by means of the first and the second hydraulic elements 16, 17; and then the workpiece is clamped. Then the connection between the first and the second hydraulic elements 16, 17 can be separated again; and the clamping is maintained by means of the clamping elements 15.

At this point the rotary part 11 of the steady rest 1, as shown in FIG. 5, in the base body 12 with the workpiece 10, which is chucked by means of the clamping elements 15 and which has the form of a turbine blade, can be rotated into the machining position. It is clear from the sectional view shown in FIG. 6 of the steady rest 1 in the machining position, which in turn may be found outside the clamping plates, that the first hydraulic elements 16 of the rotary part 11 and the second hydraulic elements 17 of the base body 12 are separated and can be moved/rotated with respect to each other by the rotation of the rotary part 11.

FIGS. 4 and 5 show that the rotary part 11 has two opposite diametral expansions 11.1, by means of which the breakthrough 1.1, which has the height H, is formed.

It goes without saying that when the rotary part of the steady rest rotates, the drives of the first clamping point 3.2 and the second clamping point 5.2 also rotate in synchronism.

The steady rest 1 allows an automatic clamping of the workpiece 10. In this case it is important that this clamping takes place in a force controlled manner. That is, all of the clamping elements 15 press against the workpiece 10 with the same force. As a result, the workpiece 10 is not deformed by the clamping cycle. In the solution according to the invention, this feature is achieved by means of hydraulic cylinders (not illustrated) that are connected in parallel and by means of which the clamping elements 15 can be actuated.

The position of the clamping cylinders and the form of the clamping elements 15, mounted on the clamping cylinders, can be adapted to the workpiece geometry.

After chucking, the clamping elements 15 have to be clamped and, thus, fixed in their clamping position. In the case of a purely force-controlled clamping the clamping elements 15 would change their position due to the changes in force (machining forces or more specifically the changes in the direction of the gravitational force relative to the workpiece). The clamping is carried out by means of the hydraulically operated clamping sleeves around the hydraulic cylinders (also not illustrated). The clamping force has to be maintained during the machining, therefore, during a continuous rotating motion of the steady rest 1. To this end the hydraulic elements in the form of check valves and a concurrently rotating pressure accumulator (not illustrated) are used.

The chucking, clamping and releasing are performed by connecting the steady rest 1 in a docking position (FIG. 4) between the rotary part 11 and the stationary part in the form of the base body 12 of the steady rest.

The device works in the following way.

For loading and unloading, the steady rest 1 is moved on the side over a clamping point, in this case the first clamping point 5.2. The clamping region of the workpiece 10 is designed on an end face in such a way that the steady rest 1 in the open position of the clamping elements 15 can move out of an axial "end position" over this position, so that the region between the first clamping point 3.2 and the second clamping point 5.2 remains free for the two end faces of the workpiece 10.

Following the loading of the workpiece 10 and the clamping on its end faces, the steady rest 1 moves out of the axial end position in the region of the second clamping point 5.2 per an NC program along the longitudinal axis/the machining axis A (FIG. 2) over the workpiece as far as to the desired supporting position and, thus, receives this workpiece on the peripheral side. Since the rotation of the steady rest 1 is controlled by a numerical control (NC) program, collisions with the workpiece 10 are prevented.

Then the workpiece 10 and the steady rest 1 are rotated into the docking position (FIGS. 3 and 4). The hydraulic pressure is connected; and the workpiece 10 is chucked and clamped. Following the connection of the hydraulic unit, the steady rest 1 can be rotated with the workpiece 10 into the machining position (FIGS. 5 and 6); and the machining begins. In order to be able to machine the region, in which the steady rest 1 is standing, this steady rest is then released, moved and eventually chucked and clamped again at a different position.

The solution according to the invention makes it possible, according to one exemplary embodiment that is not illustrated, to move the steady rest along the longitudinal axis A as the machining operation advances, when the clamping by means of the clamping elements is configured accordingly.

In summary, the invention provides an effective method for machining non-rotationally symmetrical workpieces. The use of a steady rest that is closed on the peripheral side prevents the steady rest from bending due to the clamping forces of the clamping elements. Only an axial back and forth movement of the steady rest between the loading and removal position and the machining position is required, as a result of which less working space is needed; and the design configuration is simpler and more reliable.

The invention claimed is:

1. A method for machining an elongate, non-rotationally symmetrical workpiece, wherein a first clamping point for a first end of the workpiece and a second clamping point for a second end of the workpiece are provided, and the workpiece is supported by a steady rest, which has clamping elements for clamping the workpiece on a non-rotationally symmetrical cross section, comprising:
   after clamping the workpiece between the first and the second clamping point, moving the steady rest with its open clamping elements along the longitudinal axis of the workpiece into a supporting position; and
   during movement of the steady rest into the supporting position and/or while changing the supporting position of the steady rest, preventing a collision between the open clamping elements of the steady rest and the workpiece by way of a program-controlled rotation of a rotary part of the steady rest.

2. The method as claimed in claim 1, wherein, for loading and unloading the workpiece, the steady rest moves at least partially over the first or second clamping point in such a way that the region between the first and the second clamping points is accessible for inserting and clamping the workpiece.

3. The method as claimed in claim 1, wherein, in the supporting position, the steady rest clamps the workpiece with one or more clamping elements, and then machining of the workpiece begins.

4. The method as claimed in claim 1, wherein, the clamping elements of the steady rest are hydraulic clamping elements located on a rotary part of the steady rest; and wherein, for actuating the clamping elements, the rotary part of the steady rest is rotated into a docking position in which hydraulic elements of a base body part of the steady rest that are configured to actuate the hydraulic clamping elements are connectable to and separable from the hydraulic clamping elements.

5. The method as claimed in claim 1, wherein, in the docking position a hydraulic pressure is coupled to the clamping elements by the hydraulic elements; wherein, as a result, the workpiece is chucked and clamped; wherein, then, the connection to the hydraulic elements is released and the clamping is retained; wherein, then, the rotary part of the steady rest can be rotated out of the docking position; and wherein the machining of the workpiece begins.

6. The method as claimed in claim 1, wherein, in order to machine the region of the workpieces that the steady rest covers, clamping of said steady rest to the workpiece being released, the steady rest is moved along the machining axis and, if desired, chucked and clamped again at a different position; and wherein the program-controlled rotation of the steady rest prevents a collision between the open clamping elements of the steady rest and the workpiece.

7. The method as claimed in claim 1, wherein, during the rotating machining of the workpiece, the steady rest is arranged between the clamping points, chucks the workpiece, and is rotated synchronously to the drives of the clamping points by a rotary drive of the steady rest, so that torsional stresses in the workpiece are reduced or prevented.

\* \* \* \* \*